United States Patent [19]
Yazaki

[11] 3,750,552
[45] Aug. 7, 1973

[54] EXPOSURE CONTROL APPARATUS FOR FLASH CAMERAS

[75] Inventor: Mutsunobu Yazaki, Yokohama, Japan

[73] Assignee: Canon Kabushiki Kaisha, Tokyo, Japan

[22] Filed: Sept. 29, 1971

[21] Appl. No.: 184,718

[30] Foreign Application Priority Data
Oct. 2, 1970 Japan.............................. 45/98261

[52] U.S. Cl................ 95/11.5 R, 95/10 C, 95/64 D
[51] Int. Cl......... G03b 9/70, G03b 7/08, G03b 9/24
[58] Field of Search ...................... 95/11.5 R, 11 L, 95/10 C, 64 R, 64 C, 64 D

[56] References Cited
UNITED STATES PATENTS

| 3,380,359 | 4/1968 | Landbrecht...................... 95/11.5 R |
| 3,118,356 | 1/1964 | Sauer et al....................... 95/64 D X |
| 3,498,192 | 3/1970 | Tadashi Ito et al.......... 95/11.5 R X |
| 3,127,824 | 4/1964 | Williams............................. 95/11 L |
| 3,610,124 | 10/1971 | Hiruma .............................. 95/11 L |

*Primary Examiner*—Robert P. Greiner
*Attorney*—Toren & McGeady

[57] ABSTRACT

In the disclosed exposure control device for a flash camera, a diaphragm shutter is movable from a normally closed position to a plurality of open positions each of which corresponds to a diaphragm opening of a different size. An indicating pointer projects from an exposure meter and stops at a position corresponding to a measured condition. A shutter release frees a scanning arm from an initial position and allows it to move until the arm is stopped by the pointer at a position determined by the meter. The pointer and arm in effect lock each other in position. The scanning arm carries a stopping cam to a position determined by the pointer. An aperture adjuster in the diaphragm shutter moves in response to the shutter when the latter is released by the shutter release. A movable portion in the aperture adjuster travels with the aperture adjuster until it engages one of a number of different portions of the cam on the basis of the pointer-determined position of the cam. The cam and the movable portion are conductive so as to form a synchronizing switch for a flash.

7 Claims, 8 Drawing Figures

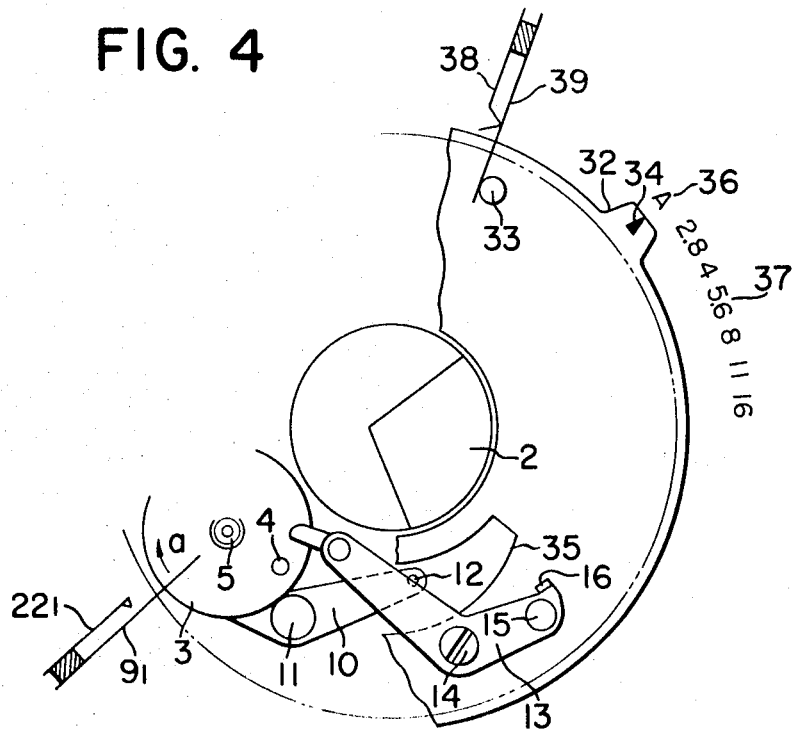
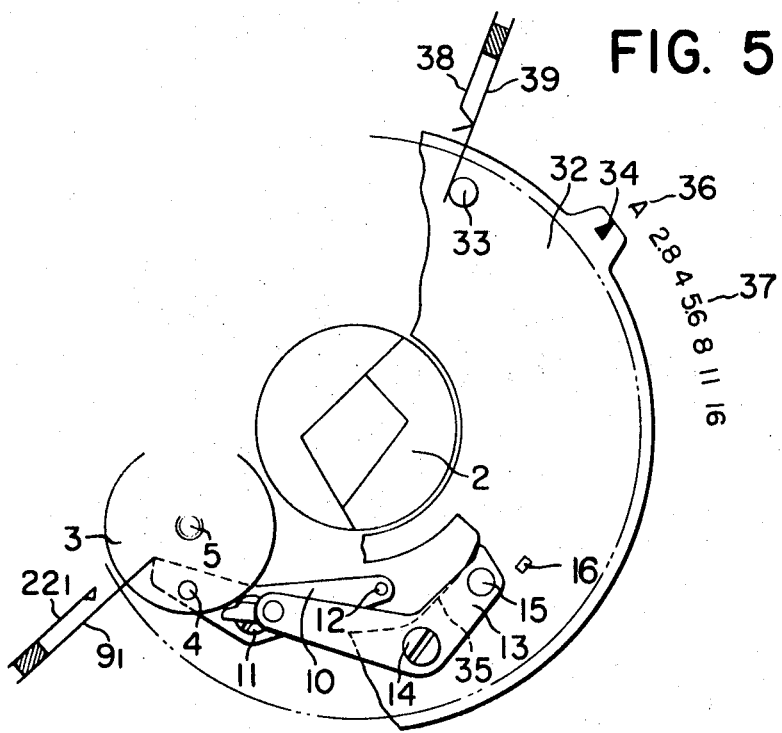

INVENTOR
MUTSUNOBU YAZAKI

BY Toren and McHeady
ATTORNEY

EXPOSURE CONTROL APPARATUS FOR FLASH CAMERAS

The present invention relates to an exposure control device for a flash photographing.

In a conventional exposure control device for flash photographing with a shutter device having blades both for diaphragm aperture control and shutter speed control, the timing of triggering of a flash device by means of a synchronizer contact switch is adjusted at a fully opened position of the blades so as to give a constant shutter speed of 1/30 second for flash photographing.

However, the above conventional device has a defect that it is not applicable for determination of an exposure condition by means a meter which is responsive to a shooting distance, because the synchronizer contact switch triggers the flash device only when at the fully-opened position of the blades.

The main object of the present invention is to overcome the above defect.

The main feature of the present invention is that an appropriate exposure is obtained through triggering the flash device to illuminate at the time when the diaphragm aperture is determined.

Another feature of the present invention is that a diaphragm aperture control means comprises a flash-auto mechanism and an EE mechanism and serves for automatic flash photographing and automatic day-light photographing respectively.

The present invention will be described in details referring to embodiments shown in the attached drawings.

Figure 6:
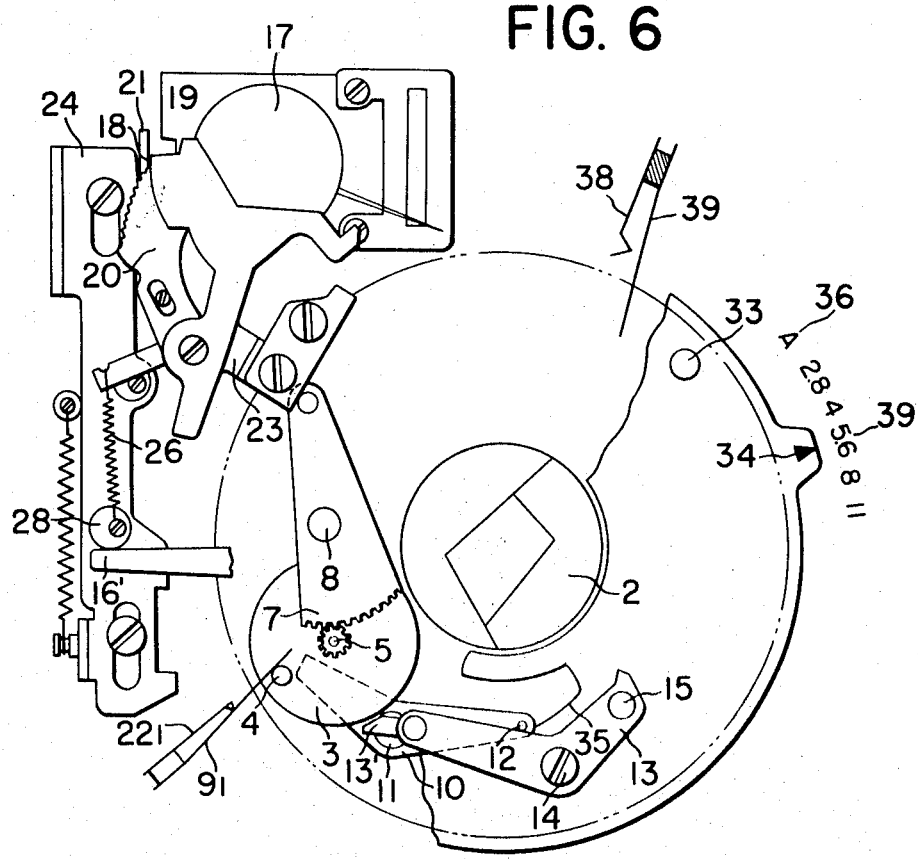

FIGS. 4, 5 and 6 shows the modified embodiment, and FIG. 4 shows the condition before shutter release, FIG. 5 shows the condition in which the blades are opened to a position for a certain apperture opening for flash actuation, and FIG. 6 show the condition for manual setting of the apperture opening for a constant shutter speed and in a condition after shutter release and the condition in which the blades are opened to a position for a certain aperture opening for flash actuation.

Figure 7:
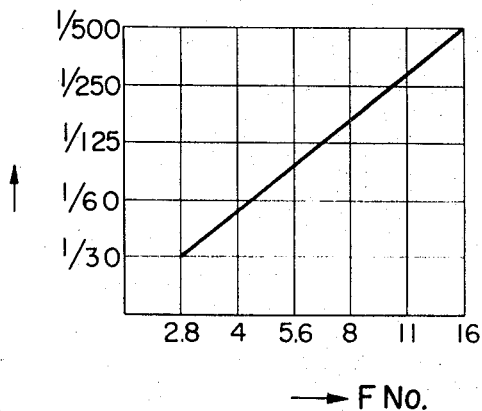

FIG. 7 is a graph showing the relation between the aperture opening and the shutter speed for an automatic exposure control of the present invention.

Figure 1:
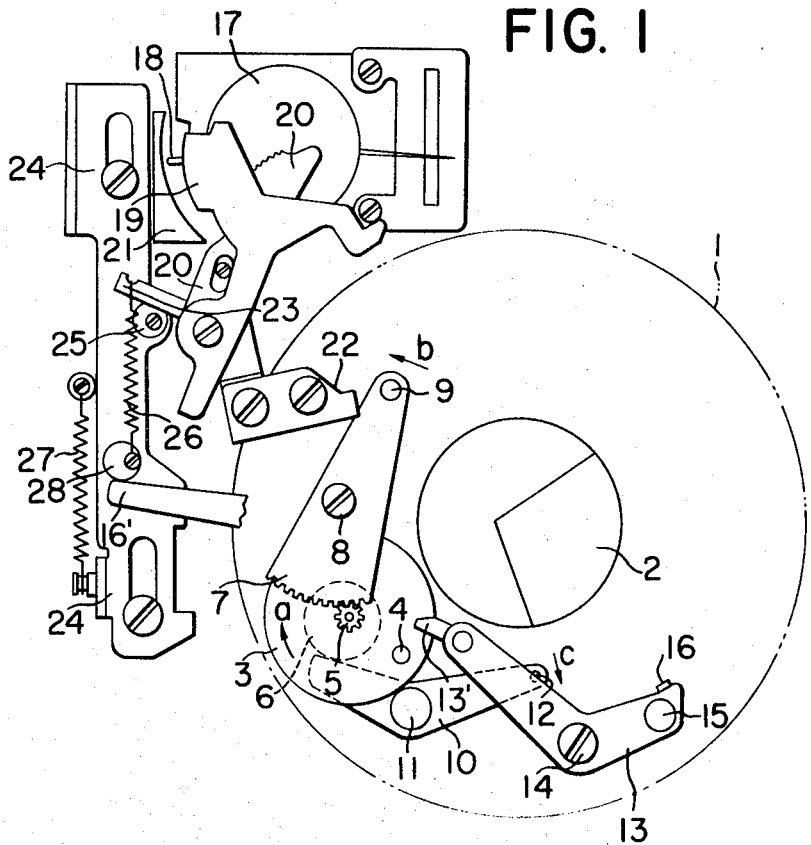
FIG. 1 shows the exposure control device according to the present invention in a condition before shutter release.
Figure 2:
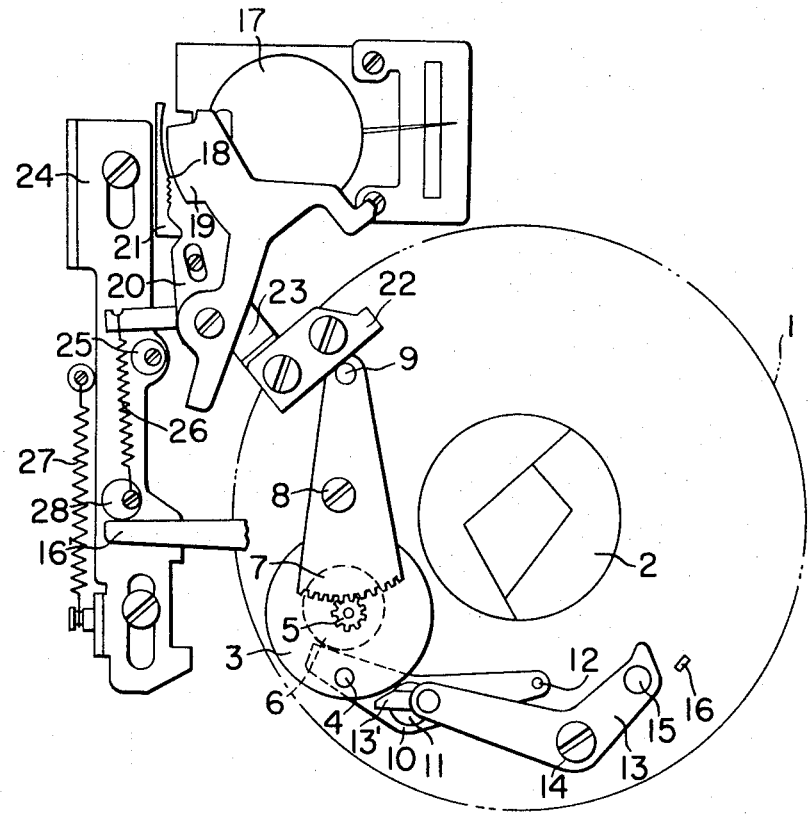
FIG. 2 shows the same after shutter release and in a condition in which the blades are opened to a position for a certain apperture opening for flash actuation.

In FIGS. 1 and 2, 1 is a shutter housing usually built in a lens barrel, 2 is a blade both for diaphragm aperture and for shutter speed, 3 is a fly-wheel rotable in a direction indicated by an arrow a when a pin 4 on the fly-wheel 3 is struck by a lever 13 to determine an exposure condition. 5 is a gear rotatable together with the fly-wheel 3 to deliver its rotational movement to a sector gear 7. 6 is a cam for transmitting the rotational movement of the fly-wheel 5 to the shutter blade, and actuates the shutter blade 2 through a pin-slot engagement (not shown) by means of a lever 10 and a pin 12 planted on the lever 10 rotatable around a fixed axis 11. 8 is a shaft for the rotation of the sector gear 7. 9 is a pin planted on the sector gear 7 and the pin 9 runs against a cam 22 for shutter speed determination to determine a certain program for exposure control. The cam 22 is electrically insulated from a lever 23 and when the cam 22 contacts with the pin 9, a triggering circuit for the electronic flash device is closed to illuminate the flash device.

13 is a lever rotatable around a shaft 14, and at one end of the lever 13, there is mounted a lever 13' rotatable only in one direction, and at the other end of the lever 13, there is planted a pin 15 for shutter charge. The lever 13 is rotated in a clockwise direction by a cam (not shown) in order to charge the shutter device into a shutter release-ready condition. 16 is a projection of a locking member which engages and locks the lever 13. The projection 16 of the locking member has an arm 16' at its other end and the arm 16' is rotated in an anti-clockwise direction through engagement with a pin 28 adjustably mounted on a release lever 24 around an axis (not shown) to release the locking engagement between the lever 13 and the projection 16 by a downward movement of the release lever 24 which is slidably mounted. 17 is an ampere meter, and an indicator pointer of the ampere meter 17 swings in response to a photo-metric device whose circuit is illustratively shown in FIG. 3A, to determine a certain shutter speed. 18 is a control pointer rotating together with the indicator pointer. By pressing down the release lever 24, a lever 23 is permitted to follow the lever 24 and is rotated in an anti-clockwise direction. On the lever 23, there are provided a clamp plate 19 a saw-toothed member 20 and the cam 22 for shutter speed determination. The relative position of the saw-toothed member 20 to the lever 23 is adjustable by means of the pin-slot engagement therebetween. An eccentric pin is provided on the lever 23. 21 is a receiving plate for the pointer 18. On the release lever 24, there is adjustably planted a pin 25 for driving the saw-toothed member 20. 26 is a spring for driving the saw-toothed member 20 and provided between one end of the lever 23 and the pin 28. 27 is a spring for restoring the release lever 24 toward its original position.

Figure 3A:
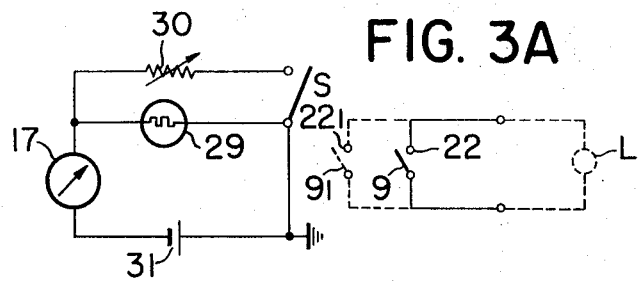
FIG. 3A is a schematic circuit diagram applicable to the device shown in FIGS. 1 and 2.

Next in FIG. 3A, 29 is a photo-conductive element of CdS for exposure detection. 30 is a resistor element which varies in association with the shooting distance for determination of F-number for a flash photographing. 31 is a battery for the meter circuit. L is a flash device with its terminals for triggering itself. S is a change-over switch from automatic day-light photography to a flash photography and the swich S is closed in association with the interconnection of the synchronizer contact switch 9, 22 and the flash device L. The conventional synchronizer contact switch 9, 22, may be built in the device on the camera side.

Figure 3B:
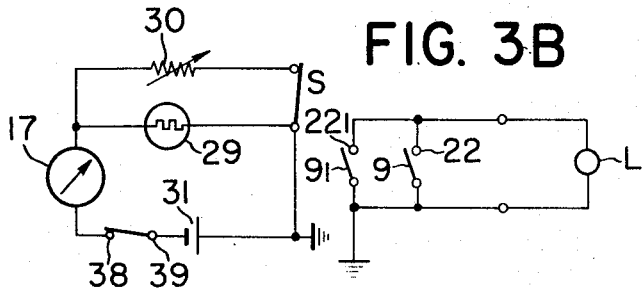
FIG. 3B is another schematic circuit diagram applicable to a modified embodiment of the present invention.

The operation of the first embodiment shown in FIGS. 1, 2 and 3 will be described hereinafter.

The lever 13 is engaged with and locked by the projection 16 at the state shown in FIG. 1. When the release lever 24 is pressed down against the spring 27, the lever 23 restricted by the pin 25 becomes rotatable by the spring 26 in an anti-clockwise direction until the pointer 18 of the meter 17 receives the saw-toothed member 20 to stop the rotation of the lever 23. The pointer 18 is provided to receive the saw-toothed member 20 after the pointer 18 is clamped by the receiving plate 21 and the clamp plate 19. The saw-toothed member 20 determines a position of the cam 22 by its moving distance. When the release lever 24 is further pressed down, the engagement of the pin 28 and the arm 16′ causes the disengagement of the lever 13 with the projection 16. Some mechanism such as a release ring may be provided between the arm 16′ and the projection 16.

The lever 13 is biased in an anti-clockwise direction by a spring (not shown) and rotates up to the position shown in FIG. 2. In the course of this rotation, the lever 13′ strikes the pin 4 to rotate the fly-wheel 3 in a direction shown by the arrow a to rotate the sector gear 7 through the gear 5 up to a position where the pin 9 on the sector gear 7 strikes the cam 22 as shown by an arrow b to determine an aperture opening and a shutter speed. Thereafter the sector gear 7 is restored to the position shown in FIG. 1 by means of a spring not shown.

The blade 2 serves to determine an exposure condition in response to the moving distance of the pin 12 through the lever 10 normally biased by a spring (not shown) against the cam 6 provided on the fly-wheel 3.

In case of an EE photographing, the photoconductive element 29 varies its resistance value and the current through the meter 17 varies accordingly. The pointer 18 of the meter 17 swings to determine an exposure condition.

In case of a flash photographing, the flash device L is coupled with a accessary shoe and thereby the changeover switch S is brough into a conductive state in an associated manner. By focus adjustment, the resistance value of the resistor 30 is varied to make the meter responsive to the shooting distance. In this case, as the photo-conductive element 19 has an increased resistance value (because of a dark object), very little influence is given to the meter.

The resistance value of the resistor 30 is predetermined to accomodate with a certain program as shown in FIG. 7 to determine an aperture opening in accordance with the shooting distance and the guide number of the flash device. When the shutter blade is released to open under the condition in which the meter swings in response to the shooting distance, the pin 9 strikes the cam 22 to determine the aperture opening and the flash device is triggered on to illuminate. As the electronic flash device with a discharge tube is applied, the time delay to flash peak is negligible.

In the embodiment described above, the lever 10 follows to the cam 6 and there appears some delay between the rotation motion of the fly-wheel 3 and the opening motion of the blade 2. This arrangement is effective both for automatic exposure control and for manual control of aperture opening.

In order to compensate the probable some mechanical delay between the rotation motion of the fly-wheel 3 and the opening motion of the blade 2, it is desirable that the real aperture opening may be controlled.

The synchronizer switch is made on at a position giving the real aperture opening larger than the aperture opening at the triggering time of the flash device.

The modified embodiment shown in FIGS. 3B, 4, 5 and 6 will be described below. Description will be made limitedly in connection with only members which are not provided in the embodiment shown in FIGS. 1, 2 and 3A.

32 is a change-over ring for automatic exposure control and manual aperture control, which ring has a projection 33 for a pair of contact members 38 and 39. At the non-contact state of the contact members 38 and 39 and under the condition of manual exposure control, the meter circuit is denergized. The ring 32 is provided further with an index mark 34 and a cam 35 for manual aperture control. 36 is a mark A for automatic control of the device. 37 is an F number scale for manual aperture control. When the index mark 34 coincides with the mark 36, an automatic exposure control for day-light photography or flash photography is obtained, while when the index mark 34 is set to any of F number scale 37 (F number is set at 5, and 6 in FIG. 6), a manual exposure control is obtained. The conventional synchronizer contact members $9_1$ and $22_1$ provided in parallel to the synchronizer contact members 9 and 22 trigger the flash device under the condition of manual exposure control.

The operations of the modified embodiments shown in FIGS. 3B, 4, 5 and 6 in case of the automatic flash photographing and automatic day-light photographing are similar to those of the embodiment shown in FIGS. 1, 2 and 3A except for the change-over ring 32 which is set for automatic exposure control.

Next the operation of the modified embodiment in case of manual exposure control, particularly in case of manual F number pre-selection with a constant shutter speed will be described below.

The change-over ring 32 is rotated to select a certain F number and the projection 33 on the ring 32 causes the contact members 38 and 39 to open the meter circuit so that the pointer of the meter 17 stops at its start position as shown in FIG. 6. At this condition, when the release lever 24 is pressed down, the saw-toothed member 20 rotates to its maximum moving distance corresponding to the fully opened diaphram aperture (F 2.8 in the drawings) and at the same time the cam 22 rotates its maximum moving angle up to a position where the cam 22 contacts with the pin 9. The contact of the cam 22 with the pin 9 is not always necessary. When the release lever 24 is further pressed down, the lever 13′ strikes the pin 4 to rotate the fly-wheel 3 so as to start the blade opening.

As the pin 9 strikes the cam 22 at the position of the maximum rotation angle of the fly-wheel 3, and the pin 9 is restored by a spring not shown, the shutter speed reaches its maximum value (1/30 second in the embodiment). As the lever 10 follows the cam 6 coaxially provided on the fly-wheel 3, and the pin 12 on the lever 10 strikes the cam 35 on the change-over ring 32 to stop its movement in the course of the follow movement of the lever 10, the movement of the blade is stopped and restricted at a certain position (F 5.6) and is closed after a constant period of time (1/30 second). The conventional synchronizer contact members $9_1$ and $22_1$ are closed to start illumination of the flash device at or near the maximum aperture opening position, as the fly-wheel 3 rotates its maximum distance. In this case even if the synchronizer contact members 9 and 22 is closed before the closure of the conventional synchronizer contact members $9_1$ and $22_1$, double flashing is prevented because successive triggering after a very short time is impossible in practice and triggering for flashing is at or near the maximum aperture opening condition.

What is claimed is:

1. An exposure control device for a flash camera, comprising a diaphragm shutter having shutter means movable from a normally uncocked position in which the diaphragm shutter is closed to one of a plurality of cocked positions each of which corresponds to a diaphragm opening of a different size, exposure meter means having an indicating pointer, shutter release means, scanning means movable in response to said shutter release means until engagement with the pointer at a position depending upon the position of the pointer, stopping means movable with said scanning means and responsive to the position of said scanning means as determined by said pointer, aperture adjusting means for said diaphragm shutter, said aperture adjusting means having movable means movably connected with said shutter means, said movable means moving from an initial position into engagement with one of a number of different portions of said stopping means as determined by the position of said stopping means and the pointer after shutter release, said moving means and said stopping means having conductive portions and forming with each other a synchronizing switch for operating a flash.

2. A device as in claim 1, wherein said stopping means is electrically insulated from said shutter means and electrically connectable to said movable means.

3. A device as in claim 1, wherein said stopping means includes an electrode member engageable with said movable means and forming a cam surface, said electrode member being electrically insulated from said scanning means and being electrically insulated from said movable means until said movable means engages said electrode member.

4. A device as in claim 3, wherein said movable means includes a mechanical governor having a first member responsive to said shutter means and engageable with said governor and a second member operatively connected with said governor and engageable with said cam surface.

5. An exposure control device as in claim 1, wherein said aperture adjusting means includes means for manually presetting the aperture to which said diaphragm shutter is to be moved, said aperture adjusting means including a second synchronizing switch and actuating means for actuating said synchronizing switch in accordance with the aperture to be attained.

6. A device as in claim 5, wherein said aperture adjusting means includes exclusion switch means for substantially excluding the exposure meter from operation and thereby preventing said exposure meter from moving said pointer.

7. An exposure control device for a flash camera, comprising a shutter device having a blade which determines the shutter speed as well as the aperture, diaphragm aperture determining means having a portion for triggering a flash, said diaphragm aperture determining means comprising an exposure meter having an indicating pointer and scanning means movable from an initial position into one of a plurality of other positions when it reaches engagement with said pointer and establishing at the one of the other positions an aperture value, said scanning means having first synchronizing switching means for flash operation, said first synchronizing switching means being positioned to switch on when the indicating pointer is scanned by said scanning means, said scanning means having second synchronizing switch means actuable to switch on when said shutter release means is actuated, said first and second switching means being connected in parallel with each other.

* * * * *